March 19, 1968 R. W. KESLIN 3,373,473
METHOD OF MAKING A SELF-SUPPORTING EXTENSION TOWER
Original Filed June 2, 1964 3 Sheets-Sheet 1
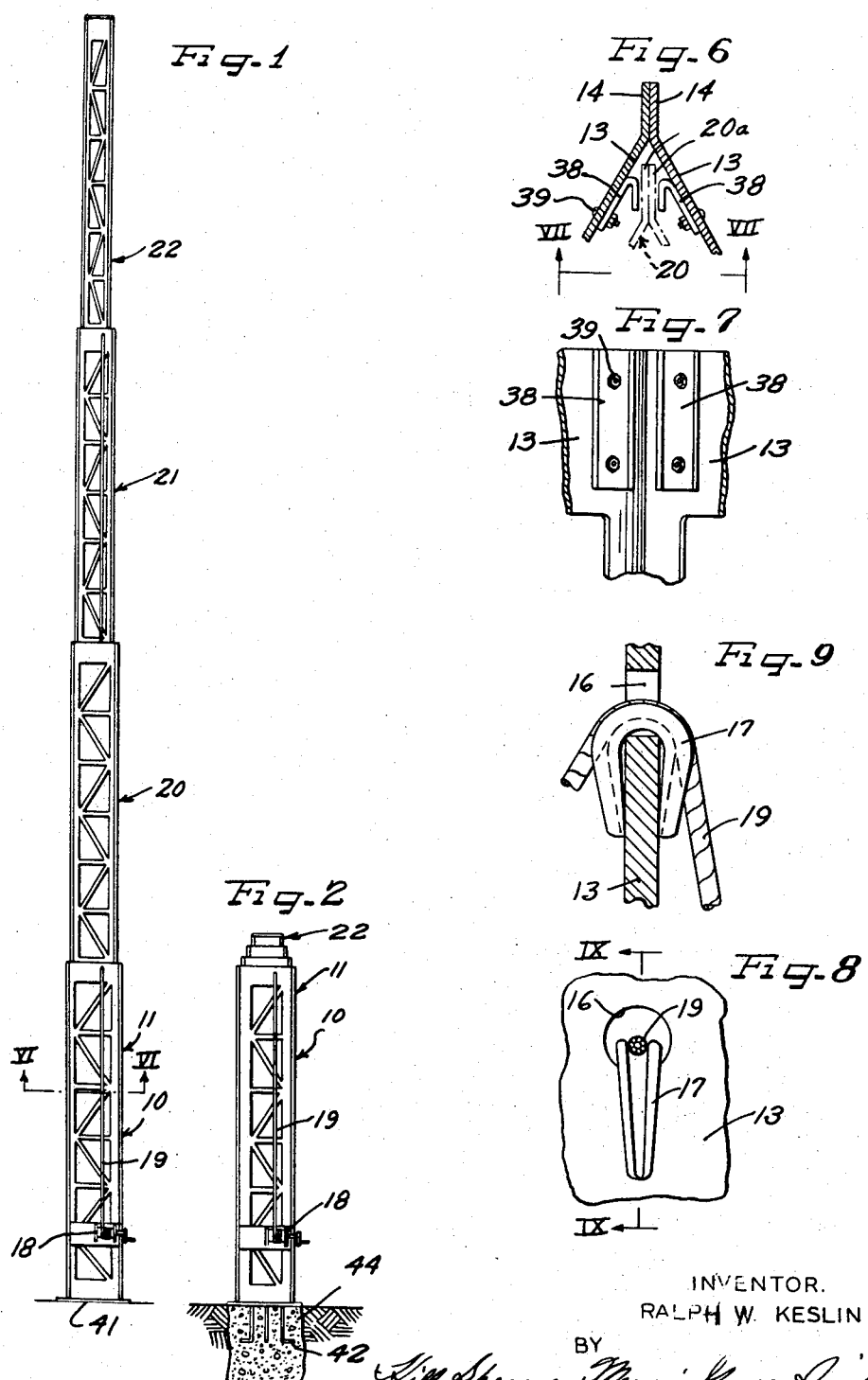
INVENTOR.
RALPH W. KESLIN
BY
ATTORNEYS

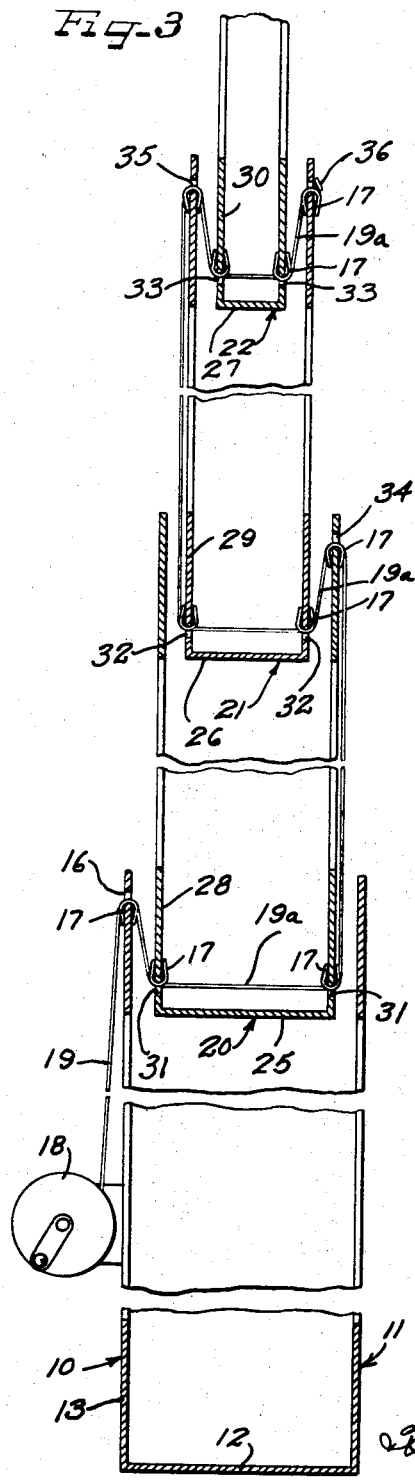

March 19, 1968 R. W. KESLIN 3,373,473
METHOD OF MAKING A SELF-SUPPORTING EXTENSION TOWER
Original Filed June 2, 1964 3 Sheets-Sheet 3
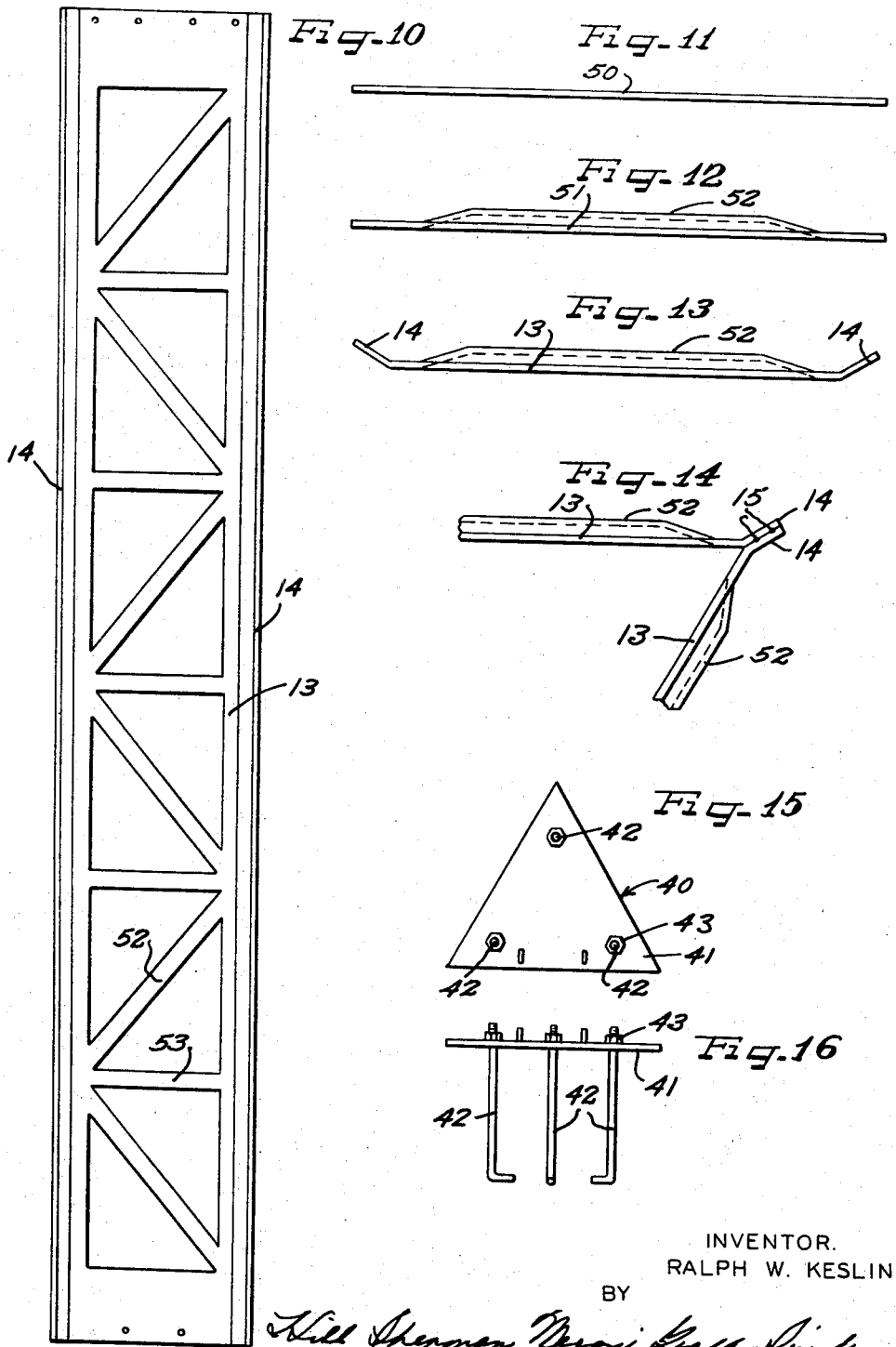
INVENTOR.
RALPH W. KESLIN
BY
ATTORNEYS

United States Patent Office 3,373,473
Patented Mar. 19, 1968

3,373,473
METHOD OF MAKING A SELF-SUPPORTING EXTENSION TOWER
Ralph W. Keslin, Calumet City, Ill., assignor to Ralph W. Keslin, Inc., Lansing, Ill., a corporation of Illinois
Original application Ser. No. 371,904, June 2, 1964, now Patent No. 3,328,921, dated July 4, 1967. Divided and this application Dec. 1, 1966, Ser. No. 608,714
6 Claims. (Cl. 29—155)

This is a division of application Ser. No. 371,904, filed June 2, 1964, now Patent No. 3,328,921 granted July 4, 1967.

The present invention relates generally to an extendible tower and to a method of manufacturing tower sections therefor.

In the past, considerable difficulty has been encountered with crank-up or extendible towers due to the tendency for the sections to bind as they are being elevated or extended. One of the problems involved in the tendency of the sections to bind has been due to the unbalancing of the load of the sections with respect to one another.

According to this invention, a new and improved suspension system has been developed for uniformly distributing the load of the tower sections on the load center of the tower. More specifically, the cable is strung transversely through each of the tower sections and vertically on opposite sides of adjacent sections with each of the elevatable sections being hung on a looped portion of the cable.

It is, therefore, an important object of this invention to provide a new and improved method of making a crank-up or extendible tower where binding between the sections can be substantially reduced as the sections are elevated.

Still another important object of this invention is to provide a new and improved method of making an expandible tower where the tower sections are formed from stampings which are secured in welded assembly.

A further important feature of this invention relates to a new and improved method of making a tower section where each side of the tower section has diagonal legs at opposite ends with the legs on adjacent sections being disposed in abutment and extending outwardly from the corner joints of the associated tower section to provide reinforced load bearing areas on each tower section.

Still another object of this invention is to provide a new and improved type of tower section which can be manufactured from a series of stampings with each stamping having cut-out areas leaving struts connecting vertical side portions of each stamping so that sway and deflection of the tower sections can be held to a minimum when subjected to wind loads, whereby the tower sections can be operated without guy wires when the tower sections are extended.

According to another feature of this invention, each tower section is provided with a stop to limit vertical movement of the tower sections when the sections are in full extended position or in closed position.

According to more specific features of this invention, I have developed a new and improved method of making a crank-up tower that is comprised of a series of extendible superimposed tower sections telescoped one within the other and within a base tower section and with the sections having a center of gravity. Cable means are provided on each side of the tower sections and positioned in a vertical plane that passes through the center of gravity for placing of the load of the tower sections on the base tower section. Additional means which includes a cable is provided for engagement with the cable guide means for extending and lowering of the tower sections relative to one another with the cable being extended transversely through the tower sections and engaged over cable guides or guide clips comprising the cable guide means.

According to still other features of this invention, each tower section has a pair of confronting cable guides that are mounted on confronting sides of the tower section as well as with a third cable guide that is mounted on one of the sides above the pair of cable guides so that the tower section can be carried on sling-shaped cable loops and moved up and down with the other tower sections according to the direction in which the cable is cranked.

A still more specific feature of the crank-up tower or expandible tower previously described relates to the positioning of the cable guides and cable all in a common plane that is parallel with one side of each of the tower sections and which passes through the center of gravity of the tower or the midpoint of the tower sections.

Another important object of this invention is to provide a new and improved tower which can be manufactured from a series of stampings at a minimum of cost without the necessity of using any tubular stock as is now conventionally used by many tower manufacturers.

Other objects and features of this invention will more fully become apparent in view of the following detailed description taken in conjunction with the accompanying drawings illustrating therein a single embodiment and in which:

On the drawings:

FIGURE 1 is a side elevation of my expandible tower shown in an expanded position;

FIGURE 2 is a side elevation of the tower shown in FIGURE 1 only with the tower sections illustrated in a closed position;

FIGURE 3 is an enlarged vertical section showing the system for suspending the tower sections;

FIGURE 4 is a top plan view of my tower;

FIGURE 5 is a vertical section similar to FIGURE 3 only with the tower sections shown in a closed position;

FIGURE 6 is a vertical section taken substantially on the line VI—VI looking in the direction indicated by the arrows as shown in FIGURE 1;

FIGURE 7 is an enlarged fragmentary view as seen on the line VII—VII looking in the direction indicated by the arrows in FIGURE 6;

FIGURE 8 is an enlarged fragmentary side view of one side of a tower section illustrating the cable suspension system;

FIGURE 9 is an enlarged fragmentary vertical section taken substantially on the line IX—IX looking in the direction indicated by the arrows as seen in FIGURE 8;

FIGURE 10 is a side view of one side of a tower section;

FIGURE 11 is an end view of a blank from which a side of a tower section is to be formed;

FIGURE 12 is an edge view of the blank shown in FIGURE 11 only after the blank has been struck to form curved struts;

FIGURE 13 is an end view of the blank shown in FIGURE 12 only with opposite ends of the blank being angled to form a tower side or side wall;

FIGURE 14 is an enlarged fragmentary end view of a tower section of the type shown in FIGURE 4 only illustrating the manner of attachment of the tower side walls with respect to one another;

FIGURE 15 is a top plan view of a base plate for attaching a base tower section into the ground; and FIGURE 16 is a side view of the base attachment structure shown in FIGURE 15.

As shown on the drawings:

The reference numeral 10 indicates generally a crank-up or expandible tower that includes a base tower section 11 as well as a series of extendible telescoping tower sections 20, 21 and 22. The tower sections preferably are of uniform length, but vary in cross-sectional dimension to permit them to be telescoped inside of one another so that they can be shipped in a compact package to the ultimate user.

The base section 11 has a base tower plate 12 which can be either of a triangular or of a square-shaped configuration, depending on the cross-sectional shape of the tower. As illustrated, the tower has a triangular cross-section and the base plate 12 is triangularly shaped. The base tower section 11 further includes three base section sides or side walls 13 which are of identical construction. Each side 13 has angled opposite ends 14, 14 with the angled ends 14 being preferably disposed at a 30° angle with respect to the plane of the associated side 13. Each side is of an identical width and length so that when the angled ends are positioned in abutment, the sides coact together to provide a triangularly shaped base tower section 11. The angled ends 14—14, on adjacent sides when engaged in abutment, are secured together by welds such as are shown at 15 in FIGURE 4.

As is shown in FIGURE 3, the upper end of one of the side walls 13 is provided with a hole 16 for receiving a cable guide or guide clip 17. The clip 17 is preferably of a spring type that can be forced over the edge of the hole 16 causing the clip legs to be spread slightly so that the clip 17 can be engaged with the side 13 of the base tower section 11 in assembly therewith.

In order to permit the extendible sections 20, 21 and 22 to be elevated with respect to the base section 11, a winch 18 is mounted on one side of the base section 11. A cable 19 is attached to the winch 18 at one end and at an opposite end to the tower section 21 as indicated at 23 in FIGURE 3.

The extendible sections 20, 21 and 22 all include base plates 25, 26 and 27 which are similar to the base plate 12 on the base section 11. The sections 20, 21 and 22 further include triangularly arranged sets of sides 28, 29 and 30. As mentioned previously, the tower sections 11, 20, 21 and 22 are all of substantially the same length, but of progressively reduced cross-sectional configuration to enable one tower section to be telescoped within another to form a compact package for shipment.

As is clearly shown in FIGURE 3, the tower sections 20, 21 and 22 are each provided with opposed sets of clip holes 31—31, 32—32, and 33—33 at lower ends spaced above the associated base plate. In addition, certain of the side section walls on the tower sections 20 and 21 at upper ends, are provided with additional clip holes 34, 35 and 36 for receiving the clips 17. All of the clip holes previously described, including the clip holes 16, 31—31, 32—32, 33—33, 34, 35 and 36 are disposed in a common vertical plane with the plane of the cable 19 which plane passes through the center of gravity of the tower or the midpoint of the tower sections and is parallel with at least one side of each of the tower sections 11, 20, 21 and 22 (FIGURE 4). By extending the cable 19 over the cable guides 17 with the cable guides being arranged in the manner just described, the cable is formed into a series of sling-shaped cable loops 19a, 19a for supporting the extendible tower sections 20, 21 and 22 on the base tower section 11.

The uppermost tower section 22 is preferably provided with a triangular closure plate 37 that is carried on the sides or side panels 30 of the tower section so that a suitable antenna may be secured thereto. The tower sections 11, 20 and 21 are further provided with stops or angled stop clips 38 which are secured to the sides or panels of the respective tower sections by means of bolt and nut fasteners 39 as is illustrated in FIGURES 6 and 7. It will be appreciated that joined sets of the angled legs 20a—20a, 21a—21a, and 22a—22a are centered between the leg guide clips or leg guides 38—38 to allow the tower sections to be moved vertically of one another in a controlled manner and to prevent the sections from twisting or rotating relative to one another.

In the installation of the tower 10, a base mounting structure 40 is provided. This structure 40 includes an attachment base plate 41 and a series of hooks 42 that are attached to the plate 41 by threaded nuts 43. Preferably, the hooks 42 are anchored in concrete 44 as illustrated in FIGURE 2.

After the tower is installed on the concrete base or foundation, the antenna, rotor, wires, etc., can be fastened to the tower. If desired, the antenna or other attachments can be secured with the upper end of the tower before the tower is elevated into a vertical position. The winch is then used to elevate the antenna to its full extended height and a lock (not illustrated) may be attached to the winch to prevent tampering. It will be appreciated that the installation of the present tower can be accomplished with ease by one man and that the tower sections can be shipped in assembled form so that they do not need to be secured together in order to save time. Also, no guy wires are necessary with the present tower provided the height of the tower does not exceed forty feet.

The present tower sections lend themselves to economical manufacture since the sides or side panels of the tower can each be cut from a flat blank 50 to provide diagonal and horizontal struts 52 and 53 thereon and to cut out large areas of the blank 50 to reduce wind load. The various holes required for the cable clips can also be cut in this same operation and the angled ends or legs such as legs 14—14 can also be simultaneously formed as is illustrated in FIGURES 12 and 13. The sheet metal panels on each tower section are identical to one another to facilitate manufacture. In the press operation, the struts 52 and 53 are preferably reinforced by forming each strut with a generally C-shaped cross-sectional configuration.

The three panels of each tower section are then placed in a jig to form a triangular tower section and the legs are welded together as is illustrated in FIGURE 14. The base plate 12 is then welded to the bottom ends of the panels or sides to further reinforce the tower section. These base plates also provide stops to limit the vertical extension of the tower sections with respect to one another. After the tower sections are formed to shape, different types of protective coatings may be applied thereto and excellent results can be obtained where the sections are dipped into galvanizing material after fabrication.

The tower sections may be assembled by telescoping them within each other after the guide clips 17 are placed in the holes provided. The cable is then extended over the guide clips and attached at an upper end of the tower section 21 at 23 (FIGURE 3).

The present tower 10 has been found to have a number of advantages over prior types of extendible towers in that the tower can be economically shipped, installed and maintained. Further, when the tower is installed, it has a pleasing appearance and dangerous guy wires can be eliminated, if desired. The present tower can also be conveniently lowered and raised at any time for maintenance and adjustment of the antenna or other attachments. It is not necessary that the tower be climbed at any time. The cable reeving system, as provided, enables the load of the tower sections to be uniformly distrbuted during the raising and lowering operations to prevent binding.

Although minor modifications might be suggested by those versed in the art, it should be understood that I wish to embody within the scope of the patent warranted hereon, all such modifications as reasonably and properly come within the scope of my contribution to the art.

I claim as my invention:

1. A method of manufacturing a tower section comprising the steps of forming a series of rectangular side walls or panels each of flat sheet material of relatively uniform gage, cutting out triangularly shaped areas along the length of the rectangularly shaped sheet material while contemporaneously working and arcuately forming struts peripherally defined by the cut-out areas and while contemporaneously forming angled legs extending continuously along the length of opposite margins of the sheet material, arranging the thus formed side walls or panels in tubular form with the angled legs on adjacent side walls or panels being engaged in face-to-face relation and with the legs extending outwardly and away from the side walls or panels, and securing the abutting legs in unitary assembly.

2. A method of manufacturing a tower section comprising the steps of forming a series of rectangular side walls or panels each of flat sheet material of relatively uniform gage, cutting out areas along the length of the rectangularly shaped sheet material while contemporaneously working and forming struts peripherally defined by the cut-out areas and while contemporaneously forming angled legs extending continuously along the length of opposite margins of the sheet material, arranging the thus formed side walls or panels in tubular form with the angled legs on adjacent side walls or panels being engaged in face-to-face relation and with the legs extending outwardly and away from the side walls or panels, and securing the abutting legs in unitary assembly.

3. A method of manufacturing a tower section comprising the steps of forming a series of rectangular side walls or panels each of flat sheet material of relatively uniform gage, cutting out areas along the length of the rectangularly shaped sheet material while contemporaneously working and forming struts peripherally defined by the cut-out areas, arranging the thus formed side walls or panels in tubular form with marginal areas on adjacent side walls or panels being engaged and securing the marginal areas in unitary assembly.

4. The method of claim 1 further characterized by attaching a base plate on one of the longitudinally opposite ends of the thus joined side walls or panels to reinforce the tower section.

5. The method of claim 1 further characterized by contemporaneously working and arcuately forming generally horizontal struts and diagonal struts peripherally defined by the cut-out areas contemporaneous with said step of forming said angled legs.

6. The method of claim 1 further characterized by the legs each being shaped so as to be positioned at a 30° angle relative to a plane extended through the flat sheet material on which the legs are integrally joined at its opposite ends.

References Cited
UNITED STATES PATENTS

| | | | |
|---|---|---|---|
| 1,215,061 | 2/1917 | Rice et al. | 29—155 |
| 1,645,060 | 10/1927 | Kraft | 52—634 |
| 2,942,700 | 6/1960 | Paramenter et al. | 52—121 |
| 2,990,038 | 6/1961 | Diamond | 29—155 |
| 3,000,473 | 9/1961 | Reynolds | 52—121 |

THOMAS H. EAGER, *Primary Examiner.*